United States Patent [19]

Ortelt et al.

[11] Patent Number: 5,705,597
[45] Date of Patent: Jan. 6, 1998

[54] KETONE-ALDEHYDE RESIN WITH WIDE COMPATIBILITY, PROCESS FOR ITS PREPARATION, AND COMPOSITION CONTAINING SAME

[75] Inventors: Martina Ortelt, Marl; Werner Freitag, Dorsten; Christina Machate, Marl, all of Germany

[73] Assignee: Huels Aktiengesellschaft, Marl, Germany

[21] Appl. No.: 388,283

[22] Filed: Feb. 14, 1995

[30] Foreign Application Priority Data

Feb. 16, 1994 [DE] Germany .................. 44 04 809.2

[51] Int. Cl.$^6$ ................................................. C08G 8/02
[52] U.S. Cl. .................. 528/128; 128/125; 128/129; 128/230; 128/248; 128/503; 525/521; 525/934; 428/425.3
[58] Field of Search ............... 528/78, 125, 128, 528/129, 230, 248, 503; 106/20 R, 401; 525/521, 934; 428/425.3

[56] References Cited

FOREIGN PATENT DOCUMENTS

| 445609A2 | 9/1991 | European Pat. Off. . |
| 1262600 | 3/1968 | Germany . |
| 24 00 194 | 7/1975 | Germany . |
| 1 262 600 | 3/1978 | Germany . |
| 28 31 613 | 1/1980 | Germany . |
| 55420A2 | 5/1991 | Hungary . |

Primary Examiner—James J. Seidleck
Assistant Examiner—Duc Truong
Attorney, Agent, or Firm—Oblon, Spivak, McClelland, Maier & Neustadt, P.C.

[57] ABSTRACT

Ketone-aldehyde resins with wide compatibility, process for their preparation, and their use. The invention relates to ketone-aldehyde resins with wide compatibility comprising cycloaliphatic ketones and, in particular, formaldehyde and, if desired, further monomers, to a process for their preparation and to their use as hard resin in paints, printing inks and other coatings, especially in pigment preparations.

12 Claims, No Drawings

KETONE-ALDEHYDE RESIN WITH WIDE COMPATIBILITY, PROCESS FOR ITS PREPARATION, AND COMPOSITION CONTAINING SAME

BACKGROUND OF THE INVENTION

1. Field of the Invention

The invention relates to a ketone-aldehyde resin with wide compatibility, comprising cycloaliphatic ketones and, in particular, formaldehyde and, if desired, further monomers, to a process for its preparation and to compositions which use a hard resin, such as in paints, printing inks and other coatings, especially in pigment preparations.

2. Discussion of the Background

The condensation of cyclohexanone and methylcyclohexanone with an aldehyde, especially with formaldehyde, in the presence of alkali to give condensation products of a wide variety of kinds is generally known (Ullmann's Encyclopedia of Industrial Chemistry Vol. 23, Verlag Chemie Weinheim, 1993, pages 99 to 105). These resins do not have virtually universal solubility and compatibility over the entire spectrum of solvents and binders. In particular, the pure aliphatic compounds and white spirits which, for ecological and toxicological reasons, are increasingly being employed, are unsuitable as diluents. In addition, important binder types such as long-oil alkyd resins, vegetable oils, hydrocarbon resins and polyamides are usually incompatible. For this reason, too, an application in mineral oil-based printing inks and universal tinting systems or pigment preparations is not possible.

For economic and logistical reasons there is an increased production of pigment preparations which must be capable of being employed in as many common coating systems as possible. Tinting pastes based on cyclohexanone- or methylcyclohexanone-formaldehyde resins lead to instances of instability, especially in coating systems comprising binders and solvents of low polarity.

EP-B 0 007 106 discloses polycondensation products of aliphatic and cyclic ketones, which, prepared by the process disclosed therein, have very high softening points and are therefore insoluble in aliphatic solvents.

The object of the invention was to develop ketone-aldehyde resins with wide compatibility and a process for their preparation. The resin should be compatible with as wide as possible a spectra of coating binders. It should possess a solubility which is as universal as possible, with solubility in aliphatic compounds being a particular desire. The usual properties of ketone-aldehyde resins should be maintained and good pigment wetting should be ensured.

SUMMARY OF THE INVENTION

The object of the invention is achieved by ketone-formaldehyde resins which comprise cycloaliphatic ketones, aldehyde and, if desired, further monomers, these resins comprising I. 40 to 100 mol %, based on all of the ketones employed, of at least one alkyl-substituted cyclohexanone having one or more $C_{1-8}$ alkyl radicals, II. 0.8 to 2.0 mol of at least one aliphatic aldehyde, per mole of all of the ketones employed, and III. 0 to 60 mol %, based on all of the ketones employed, of further ketones having aliphatic, cycloaliphatic or aromatic hydrocarbon radicals which may be substituted in the hydrocarbon chain by identical or different substituents and, in turn, by the above-mentioned hydrocarbon radicals, and, if desired, phenols and/or urea or its derivatives.

DETAILED DESCRIPTION OF THE PREFERRED EMBODIMENTS

Particularly preferred $C_1$- to $C_8$-alkyl-substituted cyclohexanones are 4-tert-butylcyclohexanone and 3,3,5-trimethylcyclohexanone.

The ketone-aldehyde resins according to the invention have a broad solubility and compatibility and are particularly suitable for pigment preparations which are capable of universal application.

The ketone-aldehyde resins according to the invention are soluble in virtually all coatings-relevant organic solvents, including in particular mineral oils, white spirits and aliphatic compounds. This provides the possibility of formulating low-odor, environmentally compatible and toxicologically harmless coating systems.

The ketone-aldehyde resins have a wide compatibility with binders and resins. In particular they are miscible even with relatively non-polar types such as long-oil alkyd resins, natural oils, hydrocarbon resins and polyamides. They are therefore particularly suitable as a hard resin in paints and printing inks.

Using the ketone-aldehyde resin according to the invention it is possible to formulate stable pigment preparations and tinting pastes which can be employed in most coating systems and lead to outstanding color properties.

The ketone-aldehyde resin according to the invention may comprise, individually or as a mixture, all alkyl-substituted cyclohexanones having one or more $C_{1-8}$ alkyl radicals. Examples which may be mentioned are 4-tert-amylcyclohexanone, 2-sec-butylcyclohexanone, 2-tert-butylcyclohexanone, 4-tert-butylcyclohexanone, 2-methylcyclohexanone and 3,3,5-trimethylcyclohexanone. 4-tert-butylcyclohexanone and 3,3,5-trimethylcyclohexanone are preferred.

$C_{1-20}$ aliphatic aldehydes which are suitable in principle are unbranched or branched aldehydes such as, for example, formaldehyde, acetaldehyde, butyraldehyde, dodecanal, etc., although it is preferred to employ formaldehyde.

The formaldehyde required is usually employed as an approximately 30% strength by weight aqueous solution. other practical forms of formaldehyde are also possible. Likewise, aromatic aldehydes such as benzaldehyde, for example, may be present in a mixture with formaldehyde.

Further monomers which the ketone-aldehyde resins according to the invention may contain are, alone or in a mixture, preferably ketones of $C_{1-20}$ aliphatic, $C_{3-20}$ cycloaliphatic, $C_{6-30}$ aromatic or a mixture thereof. Examples which may be mentioned are acetone, methyl ethyl ketone, 3-pentanone, methyl isobutyl ketone, cyclopentanone, mixtures of 2,2,4- and 2,4,4-trimethylcyclopentanone, cyclohexanone, cycloheptanone and cyclooctanone. The further monomers is intended to exclude $C_{1-8}$ alkyl substituted cyclohexanones. Methyl ethyl ketone, cyclohexanone and acetophenone, however, are preferred. Generally, however, all ketones which are mentioned in the literature as being suitable for ketone resin syntheses can be employed.

In minor amounts it is also possible, if desired, for further monomers such as phenols, urea and its derivatives to be present as additional monomers for the ketone-aldehyde resins according to the invention.

A particular embodiment of the invention comprises mixtures of cyclohexanones. Particular importance as regards performance is attached to mixtures of trimethylcyclohexanone/cyclohexanone, 4-tert-butyl cyclohexanone/trimethylcyclohexanone/cyclohexanone, and 4-tert-butylcyclohexanone/trimethylcyclohexanone.

By varying the quantitative proportions it is readily possible for the person skilled in the art to adjust resin properties such as melting point, hydroxyl number and molecular weight.

The ketone-aldehyde resins according to the invention preferably have an average molecular weight (Mn) in the range of from 500 to 1,000, particularly preferably from 500 to 800.

All known methods can be used for the resin synthesis. Conventionally, condensation is carried out in the presence of alkaline catalysts. Such reactions are described in, for example, Ullmann's Encyclopedia of Industrial Chemistry Vol. 12, Verlag Chemie Weinheim, 1976, pages 547 to 555.

Having generally described this invention, a further understanding can be obtained by reference to certain specific examples which are provided herein for purposes of illustration only and are not intended to be limiting unless otherwise specified.

EXAMPLES

The invention is illustrated in the following examples.

Examples 1–4

Preparation of ketone-aldehyde resins according to the invention

| Raw materials | Quantities employed in grams | | | |
|---|---|---|---|---|
| | Resin 1 | Resin 2 | Resin 3 | Resin 4 |
| 4-tert-Butyl-cyclohexanone | 770.2 | 490.6 | 176.7 | 172.3 |
| Methyl ethyl ketone | — | 229.3 | — | — |
| 3,3,5-Trimethyl-Cyclohexanone | — | — | 481.7 | 469.9 |
| Acetophenone | — | — | — | 134.2 |
| cyclohexanone | — | — | 112.4 | — |
| Formaldehyde (30% strength by wt.) | 699.3 | 764.0 | 573.1 | 559.0 |
| NaOH (50% strength by wt.) | 40.0 | 101.8 | 114.5 | 111.7 |

Ketones and ⅓ of the required formaldehyde in the form of an approximately 30% strength by weight formalin solution are taken as initial charge in a conventional manner and are heated to 60° C. Then the required NaOH in the form of a 50% strength by weight aqueous solution is added dropwise over the course of 15 min and the mixture is heated to 80° C. Subsequently the remaining quantity of formalin is added dropwise over the course of 90 min and the mixture is held under reflux at about 85° C. for 4 hours. After addition of glacial acetic acid to the resin formed the latter is washed to neutrality with water. Distillation results in pale yellow, brittle resins with softening points of between 80° and 90° C.

Performance Tests

I. Solubility test

Resins 1 to 4 from Examples 1 to 4 were tested for their solubility in various solvents, in comparison with two commercially available cyclohexanone-formaldehyde resins.

| | Solubility (50% strength by mass solutions) | | | | | |
|---|---|---|---|---|---|---|
| | Resin 1 | Resin 2 | Resin 3 | Resin 4 | Comparison A | Comparison B |
| Ethanol | + | + | + | + | + | + |
| n-Butanol | + | + | + | + | + | + |
| Butylglycol | + | + | + | + | + | + |
| Methyl ethyl ketone | + | + | + | + | + | + |
| Ethyl acetate | + | + | + | + | + | + |
| Butyl acetate | + | + | + | + | + | + |
| Xylene | + | + | + | + | + | + |
| White Spirit | + | + | + | + | − | − |
| n-Hexane | + | − | + | + | − | − |
| Mineral oil | + | + | + | + | − | − |

+ = completely soluble
− = insoluble or not completely soluble
Comparison A = synthetic resin AFS from Bayer AG
Comparison B = synthetic resin CA from Hüls AG

II. Compatibility test

Resins 1 to 4 from Examples 1 to 4 were tested for their compatibility with various binders and resins, in comparison with two commercially available cyclohexanone-formaldehyde resins, in a weight ratio of ketone-formaldehyde resin/binder or resin of 40:60. To this end the substances were dissolved in suitable solvents, mixed and investigated for incompatibility (clouding, etc.) in the form of a dried film on glass.

| | Compatibilities | | | | | |
|---|---|---|---|---|---|---|
| Resin/binder | Resin 1 | Resin 2 | Resin 3 | Resin 4 | Comparison A | Comparison B |
| Polymethacrylate[1] | + | + | + | + | ± | ± |
| Styrene acrylate[2] | + | + | + | + | + | + |
| Epoxy resin[3] | + | + | + | + | + | + |
| Melamine resin[4] | + | + | + | + | + | + |
| Nitro-cellulose[5] | + | + | + | + | + | + |
| Polyester resin[6] | + | + | + | + | + | + |
| Short-oil alkyd[7] | + | + | + | + | + | + |
| Long-oil alkyd[8] | + | + | + | + | ± | ± |
| Hydrocarbon resin[9] | + | + | + | + | − | − |
| Linseed oil | + | + | + | + | − | − |
| Polyamide resin[10] | + | + | + | + | ± | ± |

+ = completely compatible, or clear film
± = of limited capability, or film defects
− = incompatible, or severely clouded film
[1]PLEXIGUM ® P 28/Röhm
[2]SYNTHACRYL ® SC 126/Hoechst AG
[3]EPIKOTE ® 828/Shell
[4]MAPRENAL ® MF 900/Hoechst AG
[5]Nitrocellulose E 510/Wolff Walsrode
[6]DYNAPOL ® LH 908/Hüls AG
[7]ALKYDAL ® F 26/Bayer AG
[8]ALKYDAL ® F 681/Bayer AG
[9]NECIRES ® LF 220/160/Neville Cindu
[10]VERSAMID ® 930/Cray Valley

III. Pigment wetting test

Resin 4 from Example 4 was used to prepare tinting pastes in various colors, in conventional manner.

| Component | Quantities in parts by weight | | | |
|---|---|---|---|---|
| | a) white | b) yellow | c) blue | d) black |
| KRONOSO 2310 | 70.0 | — | — | — |
| BAYFERROXO 3920 | — | 55.0 | — | — |
| HELIOGENBLAU ® L6875F | — | — | 25.0 | — |
| Flammruβ [lamp black] 101 | — | — | — | 25.0 |
| Resin 4 | 10.0 | 12.5 | 24.0 | 15.0 |
| SER AD FX 9085 | 2.5 | 7.0 | 10.0 | 15.0 |
| SER AD FA 196 | — | 3.0 | — | 5.0 |
| Paste BENTONE ® SD 2 | 0.5 | 0.5 | — | — |
| SOLVESSO ® 100 | 17.0 | 22.0 | 41.0 | 40.0 |
| Tinting paste | 100.0 | 100.0 | 100.0 | 100.0 |

The tinting pastes were completed to the coating material by adding 10 parts by weight of tinting paste to the alkyd resin paint listed below.

| Alkyd resin paint | |
|---|---|
| ALKYDALO F 681, 55% in white spirit | 72.7 parts by weight |
| KRONOS ® 2065 | 18.5 parts by weight |
| NUODEX ® Co 6% | 0.3 parts by weight |
| NUODEX ® Pb 24% | 0.9 parts by weight |
| NUODEX ® Ca 4% | 1.0 parts by weight |
| EXKIN ® 2 | 0.3 parts by weight |
| SHELLSOL ® A | 2.5 parts by weight |
| White spirit | 3.8 parts by weight |
| Alkyd resin paint | 100.0 parts by weight |

The pastes could be admixed with the coating material without problems. The coating materials had good rheological properties and good flocculation stability.

Paint films on sheet steel were prepared and assessed in the conventional manner.

| Paint film properties: Property tested | a) white | b) yellow | c) blue | d) black |
|---|---|---|---|---|
| 20° gloss | 85% | 88% | 85% | 83% |
| 60° gloss | 91% | 92% | 91% | 89% |
| Chroma C* (CIELAB) | — | 43.1 | 46.0 | — |
| Lightness L* (CIELAB) | 91.4 | — | — | 29.2 |
| Rub Out ΔE (CIELAB) | — | 0.7 | 1.0 | 1.2 |

The other resins from Examples 1 to 3, mentioned in accordance with the invention, result in similarly good properties. The cyclohexanone-formaldehyde resins A and B used as comparison can also be used, in principle, for the above-mentioned tinting pastes. However, when formulating the finished coating material severe flocculation phenomena occur owing to instances of incompatibility. These resins cannot be used in tinting pastes capable of universal application.

Obviously, additional modifications and variations of the present invention are possible in light of the above teachings. It is therefore to be understood that within the scope of the appended claims, the invention may be practiced otherwise than as specifically described herein.

This application is based on German Patent Application P 44 04 809.2 filed in Germany on Feb. 16, 1994, the entire contents of which are hereby incorporated by reference.

What is claimed as new and desired to be secured by Letters Patent of the United States is:

1. A ketone-aldehyde condensation resin consisting essentially of:
   A) a ketone component:
      i) 40 to 100 mol % of at least one $C_{1-8}$ alkyl-substituted cyclohexanone having one or more $C_{1-8}$ alkyl radicals; and
      ii) 0 to 60 mol % of a further ketone other than i) having $C_{1-20}$ aliphatic, $C_{3-20}$ cycloaliphatic, $C_{6-30}$ aromatic hydrocarbon radicals, substituted $C_{1-20}$ aliphatic, substituted $C_{3-20}$ cycloaliphatic, substituted $C_{6-30}$ aromatic hydrocarbon radicals wherein said substituents are $C_{1-20}$ aliphatic, $C_{3-20}$ cycloaliphatic, $C_{6-30}$ aromatic hydrocarbon radicals; and
   B) 0.8 to 2.0 mol of at least one $C_{1-20}$ aliphatic aldehyde per mole of all the ketones employed,
   wherein said resin has an average molecular weight (Mn) of from 500 to 1,000 and a softening point of from 70° to 95° C.

2. The ketone-aldehyde resin of claim 1, wherein said alkyl-substituted cyclohexanone is selected from the group consisting of 4-tert-butylcyclohexanone, 3,3,5-trimethylcyclohexanone and a mixture thereof.

3. The ketone-aldehyde resin of claim 1, wherein said $C_{1-20}$ aliphatic aldehyde is selected from the group consisting of formaldehyde, acetaldehyde, butyraldehyde, dodecanal and a mixture thereof.

4. The ketone-aldehyde resin of claim 1, wherein said aliphatic aldehyde is formaldehyde.

5. The ketone-aldehyde resin of claim 1, wherein said further ketone is selected from the group consisting of acetophenone, methyl ethyl ketone, cyclohexanone and a mixture thereof.

6. The ketone-aldehyde resin of claim 1 wherein said ketone component consists of a mixture of 3,3,5-trimethylcyclohexanone, 4-tertbutylcyclohexanone and/or cyclohexanone.

7. A coating system comprising:
   i) the ketone-aldehyde resin of claim 1; and
   ii) a solvent.

8. A pigment concentrate or tinting paste comprising:
   i) the ketone-aldehyde resin of claim 1; and
   ii) a pigment.

9. A process for the preparation of a condensation ketone-aldehyde resin, comprising condensing a mixture consisting essentially of
   A) a ketone component:
      i) 40 to 100 mol % of at least one $C_{1-8}$ alkyl-substituted cyclohexanone having one or more $C_{1-8}$ alkyl radicals; and
      ii) 0 to 60 mol % of a further ketone other than i) having $C_{1-20}$ aliphatic, $C_{3-20}$ cycloaliphatic, $C_{6-30}$ aromatic hydrocarbon radicals, substituted $C_{1-20}$ aliphatic, substituted $C_{3-20}$ cycloaliphatic, substituted $C_{6-30}$ aromatic hydrocarbon radicals wherein said substituents are $C_{1-20}$ aliphatic, $C_{3-20}$ cycloaliphatic, $C_{6-30}$ aromatic hydrocarbon radicals; and
   B) 0.8 to 2.0 mol of at least one $C_{1-20}$ aliphatic aldehyde per mole of all the ketones employed
   in the presence of alkaline catalysts at temperatures of from 80° to 90° C.,
   wherein said resin has an average molecular weight (Mn) of from 500 to 1,000 and a softening point of from 70° to 95° C.

10. The ketone-aldehyde resin of claim 1, wherein said condensation is carried out in the presence of an alkaline catalyst.

11. A ketone-aldehyde condensation resin consisting essentially of:

A) a ketone component:
   i) 40 to 100 mol % of at least one $C_{1-8}$ alkyl-substituted cyclohexanone having one or more $C_{1-8}$ alkyl radicals; and
   ii) 0 to 60 mol % of a further ketone other than i) having $C_{1-20}$ aliphatic, $C_{3-20}$ cycloaliphatic, $C_{6-30}$ aromatic hydrocarbon radicals, substituted $C_{1-20}$ aliphatic, substituted $C_{3-20}$ cycloaliphatic, substituted $C_{6-30}$ aromatic hydrocarbon radicals wherein said substituents are $C_{1-20}$ aliphatic, $C_{3-20}$ cycloaliphatic, $C_{6-30}$ aromatic hydrocarbon radicals; and B) 0.8 to 2.0 mol of at least one $C_{1-20}$ aliphatic aldehyde per mole of all the ketones employed, and C) up to 60 mol % of phenol, phenol derivatives, urea, urea derivatives or mixtures thereof, wherein said resin has an average molecular weight (Mn) of from 500 to 1,000 and a softening point of from 70° to 95° C.

12. A ketone-aldehyde condensation resin consisting essentially of:

A) a ketone component:
   i) 40 to 100 mol % of at least one $C_{1-8}$ alkyl-substituted cyclohexanone having one or more $C_{1-8}$ alkyl radicals; and
   ii) 0 to 60% of a further ketone other than i) having $C_{1-20}$ aliphatic, $C_{3-20}$ cycloaliphatic, $C_{6-30}$ aromatic hydrocarbon radicals, substituted $C_{1-20}$ aliphatic, substituted $C_{3-20}$ cycloaliphatic, substituted $C_{6-30}$ aromatic hydrocarbon radicals wherein said substituents are $C_{1-20}$ aliphatic, $C_{3-20}$ cycloaliphatic, $C_{6-30}$ aromatic hydrocarbon radicals; and B) 0.8 to 2.0 mol of a mixture of formaldehyde and benzaldehyde of all the ketones employed, wherein said resin has an average molecular weight (Mn) of from 500 to 1,000 and a softening point of from 70° to 95° C.

* * * * *